(12) United States Patent
González Moreno

(10) Patent No.: US 8,166,709 B2
(45) Date of Patent: May 1, 2012

(54) SUPPORT OF A SOLAR TRACKER

(75) Inventor: José Abel González Moreno, Fustiñana (ES)

(73) Assignee: Mecanizados Solares. S.L., Fustinana (Navarra) (ES)

( * ) Notice: Subject to any disclaimer, the term of this patent is extended or adjusted under 35 U.S.C. 154(b) by 286 days.

(21) Appl. No.: 12/605,063

(22) Filed: Oct. 23, 2009

(65) Prior Publication Data

US 2010/0223865 A1  Sep. 9, 2010

(30) Foreign Application Priority Data

Mar. 4, 2009 (ES) .................................. 200900602

(51) Int. Cl.
*E04H 14/00* (2006.01)
(52) U.S. Cl. ............................................ 52/1; 52/173.3
(58) Field of Classification Search .................. 52/1, 72, 52/173.3; 126/271, 576
See application file for complete search history.

(56) References Cited

U.S. PATENT DOCUMENTS

| | | | | |
|---|---|---|---|---|
| 4,108,154 A | * | 8/1978 | Nelson | 126/576 |
| 4,203,426 A | * | 5/1980 | Matlock et al. | 126/605 |
| 4,304,221 A | * | 12/1981 | Trihey | 126/581 |
| 4,515,148 A | * | 5/1985 | Boy-Marcotte et al. | 126/570 |
| 4,820,033 A | * | 4/1989 | Sick | 359/852 |
| 6,058,930 A | * | 5/2000 | Shingleton | 126/600 |

\* cited by examiner

*Primary Examiner* — Basil Katcheves
(74) *Attorney, Agent, or Firm* — Lucas & Mercanti, LLP

(57) ABSTRACT

The invention relates to improvements in the support of a solar tracker, of the type comprising a structure (1) on which a solar panel (4) is arranged by means of horizontal articulations (3), a linear actuator (5) being included between both, which linear actuator is attached to the solar panel (4) at a point (6) which is laterally separated with respect to the axial line of the horizontal articulations (3) and with respect to the structure at a point (8) which is laterally separated therefrom, shock-absorbers (9) being arranged between the solar panel (4) and the structure (1) in the areas of the horizontal articulations (3), whereas pins (10) limiting the pivoting of the solar panel (4) in both directions are arranged in the horizontal articulations (3).

2 Claims, 3 Drawing Sheets

US 8,166,709 B2

SUPPORT OF A SOLAR TRACKER

CROSS REFERENCE TO RELATED APPLICATIONS

This Application claims the benefit of priority of Spanish Patent Application No.: 200900602 filed Mar. 4, 2009 the entire contents of which are hereby incorporated by reference.

FIELD OF THE ART

The present invention relates to capturing solar radiation for the production of electric or heat energy, proposing a solar tracker provided with improvements conferring an advantageous functionality to its support.

STATE OF THE ART

The research for solutions which allow making use of alternative natural energy resources in the best conditions has increased progressively in recent years, the research related to solar energy being emphasized in this sense.

In this field of solar energy, solar radiation-capturing panels which are arranged on bearing structures are used, said panels being able to be established in a fixed installation according to a position calculated to attempt achieving the highest incidence of the sun.

However, given that the position of the sun with respect to any point changes during the hours of the day and even throughout the year, and that the capture of solar energy is optimized when the capturing panels are perpendicularly facing the sun, bearing structures for said panels provided with sun-tracking movements have been developed.

Various types of mobile installations have been developed in this sense, such as those described in, for example, Utility Models ES1003282, ES1023938, ES1039726 and ES1042691, the embodiments of which essentially determine a combined drive of two movements by means of very complex devices.

Invention patent P200600292, of the same proprietor as the present invention, describes in turn a solar tracker formed by a V-shaped structure which is supported at the vertex in a rotating assembly with respect to a vertical axis, whereas a frame is incorporated by means of horizontal articulations on the ends of the branches of said V-shaped structure, on which frame a solar panel is formed, such that said solar panel can be oriented following a position perpendicular to the incidence of the sun by means of a combination of rotation movements with respect to the vertical axis and with respect to the horizontal articulations.

The structural assembly for supporting the solar panel according to the embodiment of said patent presents, however, vibrations due to the rotation movements on the support of the supporting structure, fatigue in the means for driving the movement of the panel with respect to the horizontal articulations, and lack of limitation of this movement with respect to the horizontal articulations to prevent exceeding safety limits.

OBJECT OF THE INVENTION

According to the invention, improvements in the support of the panel of a solar tracker such as the one of the mentioned patent P200600292 are proposed, said improvements overcoming the indicated defects of the known embodiments of said structural arrangement.

According to an improvement of the invention, between the bearing structure for the solar panel and the supporting structure there is included a linear actuator driving the movement of the panel with respect to the horizontal articulations, said actuator being attached to the bearing structure for the panel at a point which is laterally offset with respect to the axial line of the horizontal articulations, whereas at the other end it is attached to the supporting structure through an anchor determining the attachment at a point which is laterally offset towards the outside of said supporting structure.

An arrangement of the linear actuator at a large angle (greater than 65°) with respect to the solar panel is thus achieved, the effort which said actuator has to make to support and move the solar panel thus being reduced, which involves a decrease of breakdowns and lower power consumption.

According to another improvement, between the supporting structure and the bearing structure for the solar panel shock-absorbing cylinders are arranged in the areas of the horizontal articulations, whereby the vibrations caused by the rotating movement of the structural assembly on the support base are prevented from affecting the solar panel and its connections.

And according to another improvement, stops are arranged in relation to the horizontal articulations for the pivoting of the solar panel, which stops limit the pivoting of the solar panel in both directions, preventing the horizontal position from being exceeded in one of the directions and preventing an inclined position of contact of the panel with the ground from being reached in the other direction.

Therefore, by means of the invention features are achieved which affect the functional behavior of the solar tracker of application in a truly advantageous manner, the proposed improvements therefore acquiring their own identity and a preferred character in the structural arrangement of this type of solar tracker.

DETAILED DESCRIPTION OF THE INVENTION

Figure 1:
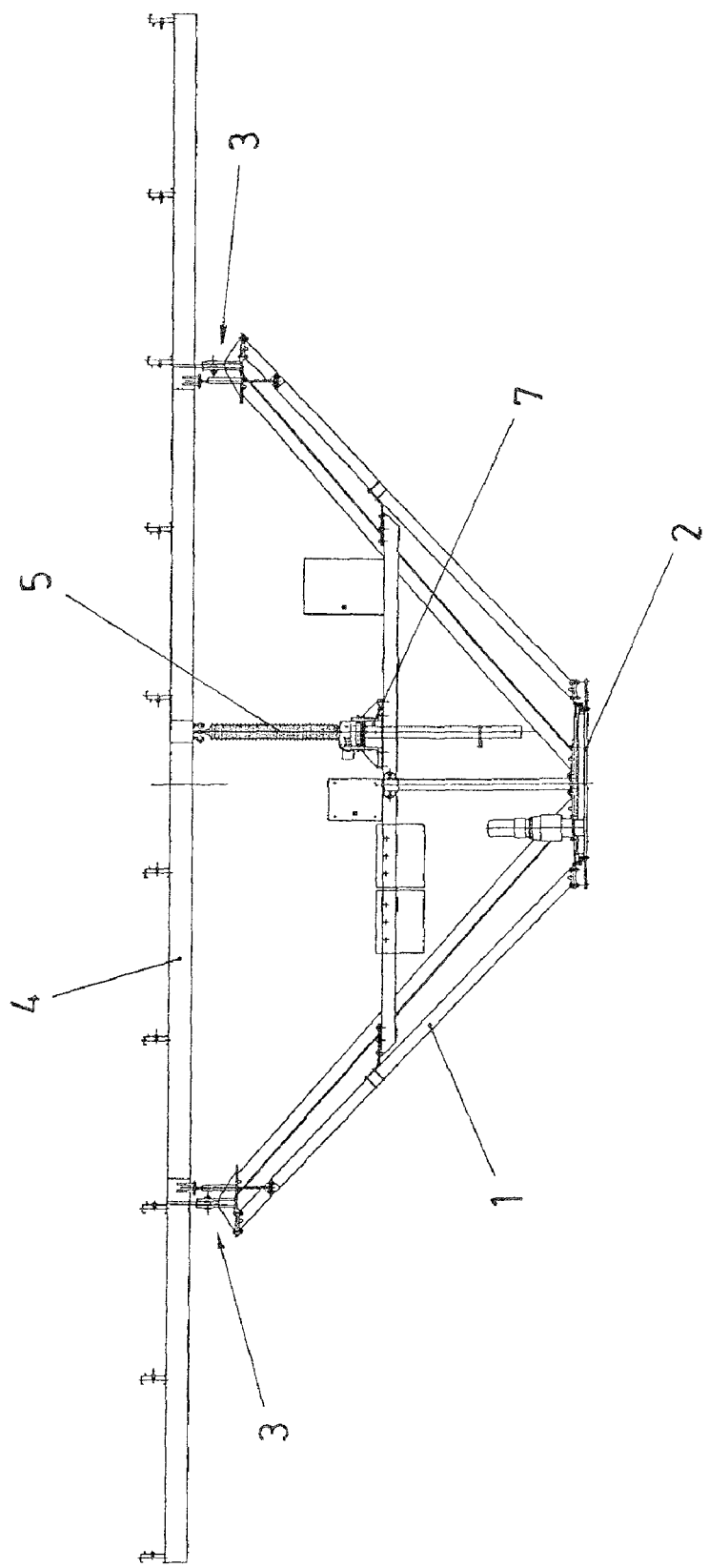
FIG. 1 shows a side view of a solar tracker with the improvements of the invention.
Figure 2:
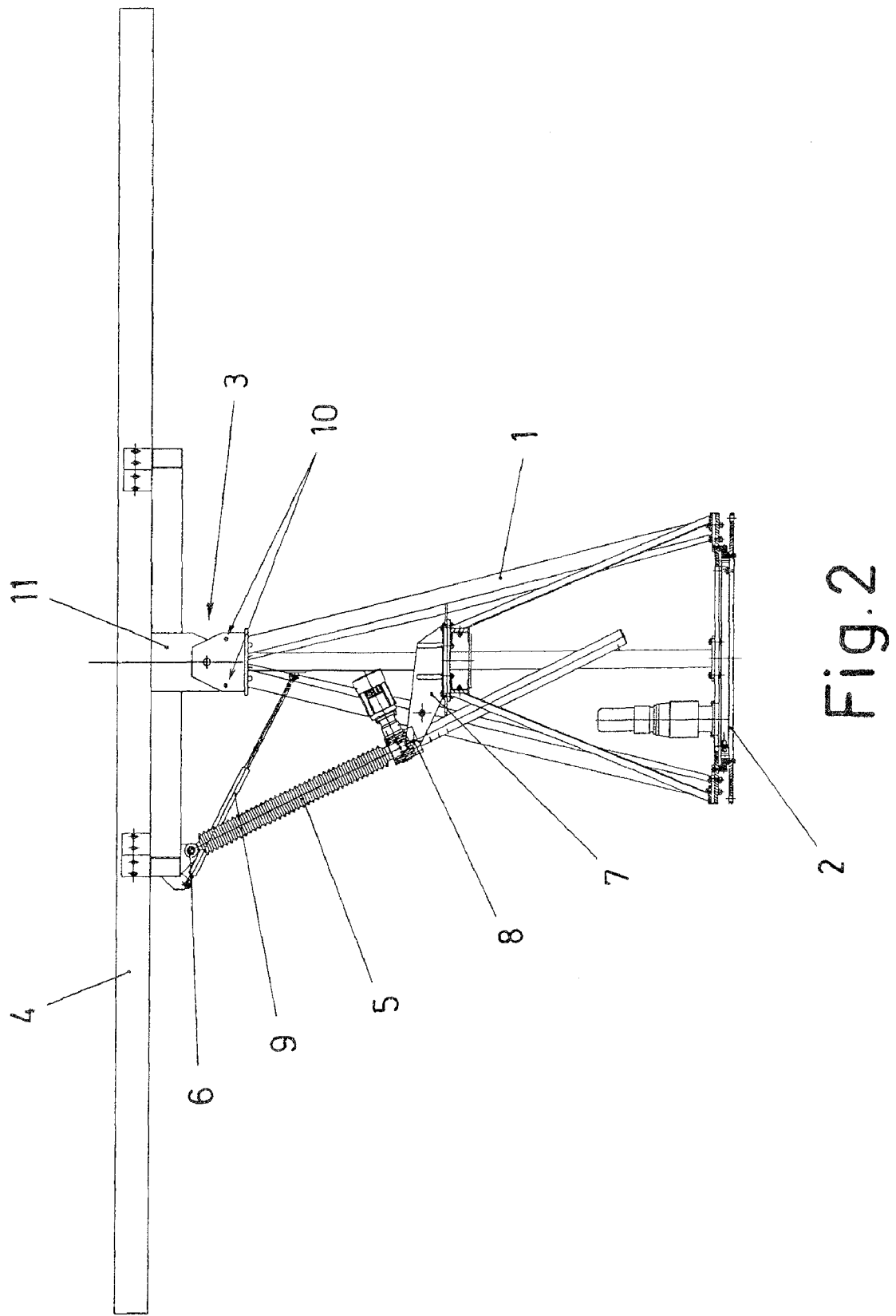
FIG. 2 is a profile view with respect to the previous figure.
Figure 3:
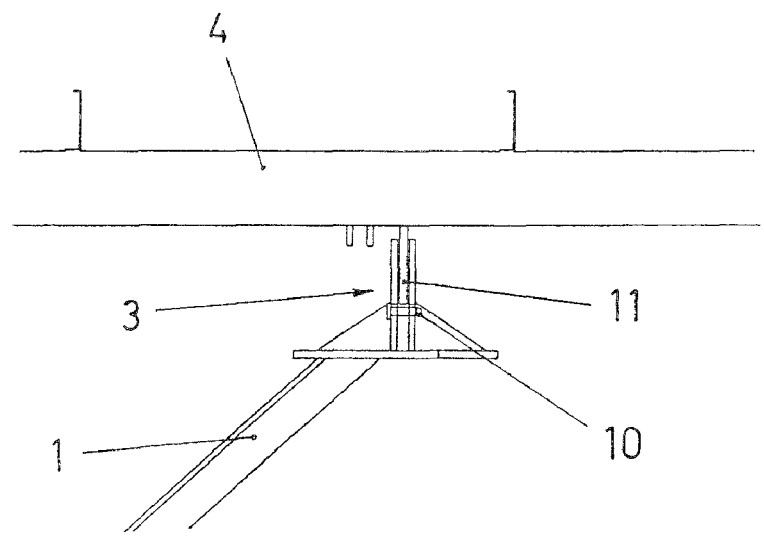
FIG. 3 is a side view of an enlarged detail of a horizontal articulation of the pivoting assembly of the solar panel of the tracker according to the invention.
Figure 4:
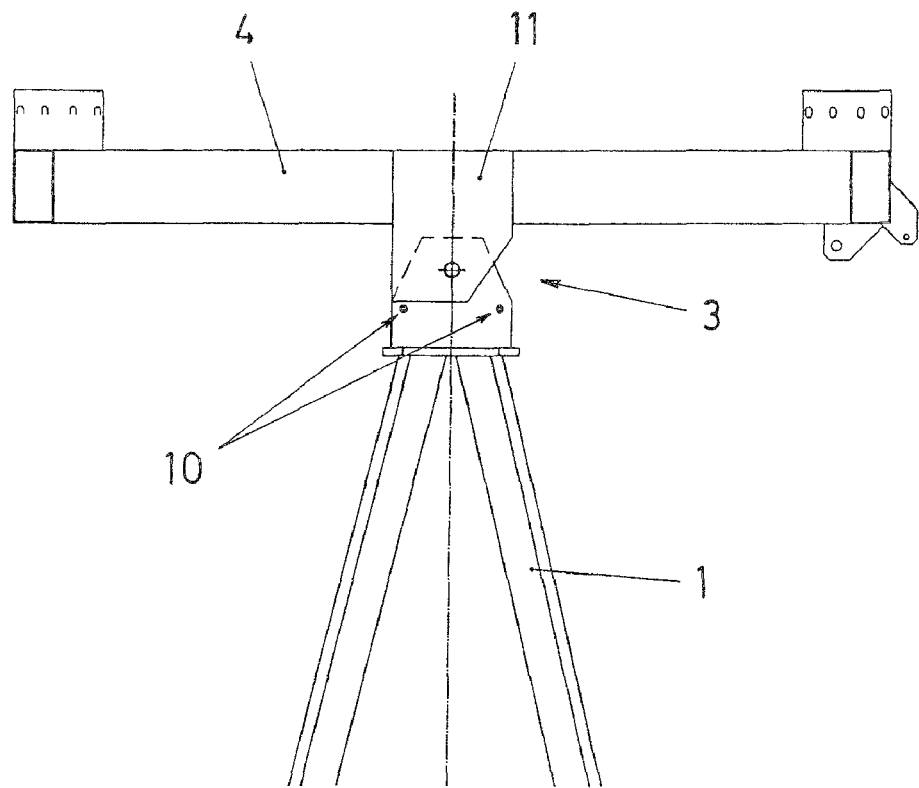
FIG. 4 is a profile view of the detail of the previous figure.

The object of the invention relates to a solar tracker of the type comprising a V-shaped structure (1) which is rotatably supported at the vertex on a base (2), a solar panel (4) being attached on the ends of the branches of said structure (1) by means of horizontal articulations (3), which solar panel can pivot in inclination, rotating on the mentioned articulations (3) such that by means of the rotation of the entire assembly on the base (2) and the play of inclination of the solar panel (4) a combination of movements is determined which allows maintaining the solar panel (4) continuously facing the sun perpendicularly.

Between the solar panel (4) and the supporting structure (1) there is arranged a linear actuator (5) by means of which the inclination movement of said solar panel (4) is driven, for which this linear actuator (5) is attached at one end to the structure of the solar panel (4) at a point (6) which is laterally separated with respect to the axial line of the horizontal articulations (3), whereas at the other end it is attached with support on the supporting structure (1).

According to the invention, the attachment of the linear actuator (5) with respect to the supporting structure (1) is established by means of an anchor (7) establishing the support of said linear actuator (5) at a point (8) which is laterally separated from the supporting structure (1), on which the anchor (7) is attached.

This arrangement allows the linear actuator (5) to be at an angle greater than 60° with respect to the solar panel (4) when the latter is horizontal, which favors the working effort of said linear actuator (5) to support and move the solar panel (4), thus improving the structural strength and the power consumption of the mentioned linear actuator (5).

According to another feature of the invention, shock-absorbing cylinders (9) are arranged between the solar panel (4) and the supporting structure (1) in the areas of the horizontal articulations (3).

The vibrations caused by the movement of the solar tracker upon rotating on the support base (8) are thus prevented from affecting the solar panel (4) and from being able to affect the components and connections thereof.

In addition, pins (10) are arranged in the horizontal articulations (3), which pins are located so that a plate (11) component of the respective articulation (3) abuts against them, said plate (11) being frontally formed with an edge parallel to the solar panel (4) and another edge inclined with respect to a side.

Thus, in the pivoting of the solar panel (4) towards one side, the plate (11) of the horizontal articulations (3) abuts with one its front edges against one of the pins (10), preventing the solar panel from being able to exceed the horizontal position; whereas in the pivoting towards the other side, said plate (11) of the horizontal articulations (3) abuts with its other front edge against the other pin (10), limiting the inclination in this direction to prevent the solar panel (4) from hitting the ground.

The invention claimed is:

1. Improvements in the support of a solar tracker comprising:
    a V-shaped structure;
    a solar panel;
    a rotatable base supporting the V-shaped structure;
    horizontal articulations having a plate and arranged between the V-shaped structure and the solar panel which allows the solar panel to pivot in inclination;
    an anchor attached to the V-shaped structure;
    a linear actuator arranged between the solar panel and the V-shaped structure, one end of the linear actuator attached to the solar panel at a distance which is laterally separated with respect to the axial line of the horizontal articulations, and the opposite end of said linear actuator attached to the anchor;
    shock-absorbing cylinders arranged between said V-shaped structure and the solar panel in the areas of the horizontal articulations;
    pins arranged in the horizontal articulations;
    the plate having one side parallel to the solar panel and the opposite side inclined such that when the edges abuts against the corresponding pins limits the pivoting of the solar panel (4) in a horizontal position towards one side and in an inclination without touching the ground on the opposite side.

2. Improvements in the support of a solar tracker according to claim 1, wherein the anchor and the linear actuator attach at a distance which is laterally coming out of the V-shaped structure.

* * * * *